United States Patent
Rasmussen

[11] 3,900,470
[45] Aug. 19, 1975

[54] ESTERS OF BENZOTHIAZINE-1,1-DIOXIDES DERIVATIVES

[75] Inventor: Chris Royce Rasmussen, Ambler, Pa.

[73] Assignee: McNeil Laboratories, Incorporated, Fort Washington, Pa.

[22] Filed: Sept. 23, 1974

[21] Appl. No.: 508,117

[52] U.S. Cl............................... 260/243 R; 424/246
[51] Int. Cl............................................. C07d 93/02
[58] Field of Search ................................ 260/243 R

[56] References Cited
UNITED STATES PATENTS
3,646,020  2/1972  Zinnes et al. .......................... 260/243
3,853,862  12/1974  Lombardino ......................... 260/243

Primary Examiner—John M. Ford

[57] ABSTRACT

Novel esters of the formula

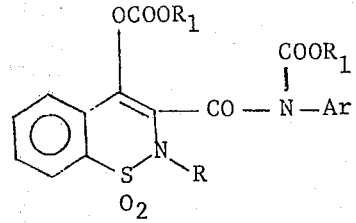

wherein R is lower alkyl, $R_1$ is lower alkyl, benzyl or phenyl, Ar is phenyl or phenyl substituted with one or two substituents selected from lower alkyl, lower alkoxy, halo and trifluoromethyl are disclosed. The compounds have anti-inflammatory properties.

2 Claims, No Drawings

ESTERS OF BENZOTHIAZINE-1,1-DIOXIDES DERIVATIVES

DESCRIPTION OF THE INVENTION

This invention relates to novel esters represented by the formula

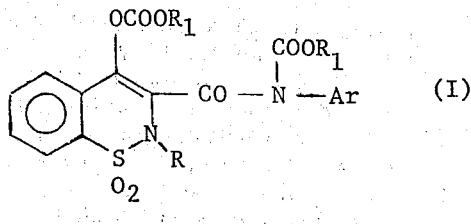

In this and succeeding formulas, R is lower alkyl, $R_1$ is lower alkyl, benzyl or phenyl, and Ar is phenyl or substituted phenyl. By "substituted phenyl" is meant phenyl substituted with at least one substituent, preferably 1 to 2 substituents selected from lower alkyl, lower alkoxy, halo and trifluoromethyl. When more than one substituent is present, they may be the same or different. By "lower" in "lower alkyl" and "lower alkoxy" is meant from about 1 to about 6 carbon atoms in the hydrocarbon portion of the radical which may be straight or branched. Representative lower alkyl radicals include methyl, ethyl, isobutyl, amyl, propyl, hexyl, etc. Representative lower alkoxy radicals include methoxy, n-butoxy, ethoxy, n-pentoxy, isopropoxy, etc. By "halo" is meant bromo, chloro, fluoro or iodo. Among the preferred compounds are those in which R is methyl, $R_1$ is methyl or ethyl, and Ar is phenyl.

The novel esters of the present invention are solids or oils soluble in many organic solvents, such as dimethylformamide, acetone, tetrahydrofuran, and of low solubility in solvents such as water. The compounds have anti-inflammatory properties adaptable for use in therapeutic compositions.

The esters of Formula I may be prepared from a 2-alkyl 4-hydroxy-2H-1,2-benzothiazine-3-carboxanilide 1,1 dioxide compound (which may be referred to as the "carboxanilide compound") represented by the formula

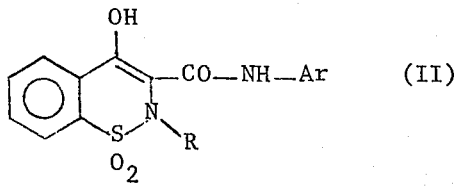

and a chloroformate, represented by the formula

in the presence of a base. (It is to be understood that the reactant carboxanilide compound represented in Formula II in the enolic form in the case of certain compounds may partially exist in the tautomeric 4-keto form. It is also to be understood that although the preparations are described generally in terms of a chloroformate, other haloformic esters may be employed.)

According to one method of preparation, the reaction is carried out in the presence of an organic base. In such method, the reactants are contacted in the presence of an organic base at temperatures in the range of from about 0°C. to about 50°C. The exact amounts of the reactants are not critical but it is desirable to employ two molar proportions or more of the chloroformic ester for each mole of the carboxanilide compound for completion of the reaction and for good yields. The reaction is preferably carried out in an aromatic heterocyclic base such as pyridine, picoline, lutidine, collidine, etc., which functions both as a base and as a solvent. Other organic bases such as triethylamine, trimethylamine, etc. may be added. Alternatively, the latter bases (at least two molar equivalents) may be employed either alone or mixed with other solvents such as tetrahydrofuran, dioxane, 1,2-dimethoxyethane, dimethylformamide, dimethyl sulfoxide, dichloromethane, 1,2-dichloroethane, etc.

In carrying out the reaction, the carboxanilide compound of Formula II is dissolved in a heterocyclic base or in a mixture of an organic base (at least two molar equivalents) and an organic solvent, and the chloroformic ester is added portionwise to the resulting solution with stirring and preferably with cooling. Stirring is continued for a period up to several hours or for such time sufficient to complete the reaction with the formation of the desired ester product of Formula I in the reaction mixture. The mixture is then poured into a cooled acidic mixture such as ice-excess hydrochloric acid whereupon the ester product precipitates and may be recovered by conventional procedures such as filtration, extraction with organic solvent, etc. The product may be purified, if desired, by procedures such as washing, triturating, recrystallizing, etc.

According to an alternate method of preparation, the reaction is carried out in the presence of an alkali metal base, preferably an alkali metal hydride. In such method, the carboxanilide compound (II) is contacted first with an alkali metal hydride base and then with a chloroformic ester in the temperature range of from about 0°C. to about 50°C. to produce the desired carbonate ester product of Formula I. The exact amount of the reactants are not critical, but it is desirable to employ about two molar proportions of alkali metal hydride and two molar proportions or more of chloroformic ester for each mole of the carboxanilide compound of Formula II. Suitable metal hydrides include sodium hydride, potassium hydride, and the like. The reactants are contacted in the presence of an organic solvent in the temperature range of from about 0°C. to about 50°C. Suitable solvents are ethereal solvents such as 1,2-dimethoxyethane, tetrahydrofuran, dioxane, etc.; aromatic hydrocarbons such as benzene, toluenes, xylenes, etc. and polar aprotic solvents such as dimethyl sulfoxide, dimethylformamide, hexamethylphosphoric acid triamide, etc.

In carrying out the reaction, the carboxanilide compound of Formula II in an inert solvent is added to a slurry of alkali metal hydride preferably in the same solvent under substantially anhydrous conditions whereupon a reaction takes place with the evolution of hydrogen gas. When the gas evolution has subsided, the chloroformic ester (III) (at least two molar equivalents) is added in one portion with stirring whereupon a further evolution of hydrogen is noted. Stirring is continued for several hours to complete the reaction with the formation of the desired ester product of Formula I and alkali metal chloride by-product. The product may be recovered from the reaction mixture by conventional procedures such as filtering off the inorganic by-product and vaporizing off most or all of the solvent. The product then may be purified, if desired, by washing, triturating, recrystallizing, etc.

The reaction appears to proceed in a stepwise manner with the formation initially of a salt (alkali metal or organic), the anion of which may be represented by Formula IV. Then when the chloroformic ester is added, esterification takes place to form an ester of Formula V which in the presence of excess base rearranges to form a salt, the anion of which may be represented by Formula VI which reacts further with chloroformic ester to produce the desired ester product of Formula I. The reaction may be represented by the following diagrammatic scheme:

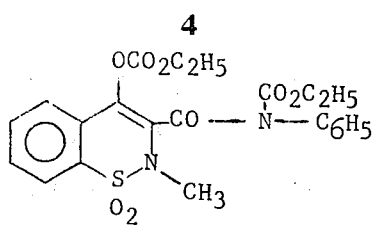

4-Hydroxy-2-methyl-2H-1,2-benzothiazine-3-carboxanilide 1,1-dioxide, 19.8 g (0.06 mole) and 25 ml of triethylamine were dissolved in 250 ml of dry pyridine and to the resulting solution was added 25 ml of ethyl chloroformate dropwise over a period of 30 minutes. Thereafter the reaction mixture was stirred for an additional 30 minutes and then poured into ice-hydrochloric acid mixture (HCl being present in molar excess of the amount necessary to neutralize the organic base) whereupon a solid precipitated. The latter

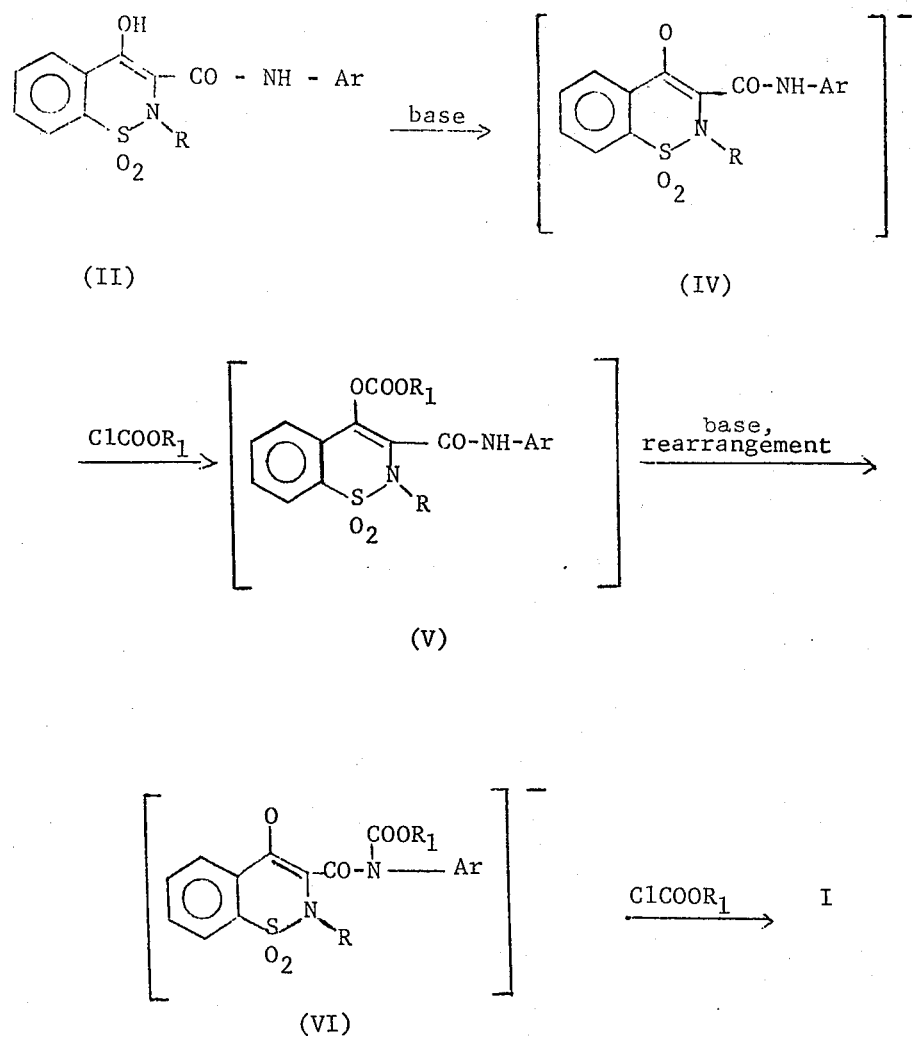

The following examples illustrate the invention but are not to be construed as limiting:

EXAMPLE I

Ethyl N-(4-Ethoxycarbonyloxy-2-methyl-2H-1,2-benzothiazine-3-carbonyl)carbanilate 1,1-dioxide was recovered by filtration, and purified by dissolving in acetone, warming the acetone solution and adding methanol to vaporize off the acetone and replace with methanol, and thereafter, cooling the methanol solution to precipitate the desired ethyl N-(4-ethoxycarbonyloxy-2-methyl-2H-1,2-benzothiazine-3-carbonyl) carbanilate 1,1-dioxide product. By recrystallization of the latter from methanol, an 87% yield of purified product, m.p. 140.5°–141.5° was obtained.

Analysis — Calcd for $C_{22}H_{22}N_2O_8S$: C, 55.69; H, 4.67; N, 5.90; S, 6.76. Found: C, 55.70; H, 4.72; N, 5.90; S, 6.82.

EXAMPLE II

Benzyl N-(4-Benzyloxycarbonyloxy-2-methyl-2H-1,2-benzothiazine-3-carbonyl)carbanilate 1,1-dioxide In a similar manner, 51.0 g (0.30 mole) of benzyl chloroformate is added dropwise with stirring to a solution of 19.8 g (0.06 mole) of 4-hydroxy-2-methyl-2H-1,2-benzothiazine-3-carboxanilide 1,1-dioxide in 250 ml of dry pyridine, the resulting mixture stirred for about an hour at ambient temperature and then poured into hydrochloric acid-ice mixture to precipitate the desired benzyl N-(4-benzyloxycarbonyloxy-2-methyl-2H-1,2-benzothiazine-3-carbonyl)carbanilate 1,1-dioxide product having a molecular weight of 598.

EXAMPLE III

In operations carried out in a manner similar to that described in Example I and Example II, the following compounds may be prepared from the appropriate carbanilate compound and appropriate chloroformic ester in the presence of pyridine:

Ethyl N-(4-ethoxycarbonyloxy-2-methyl-2H-1,2-benzothiazine-3-carbonyl)-3',5'-dimethylcarbanilate 1,1-dioxide by the reaction of 4-hydroxy-2-methyl-2H-1,2-benzothiazine-3-(3',5'-dimethyl-carboxanilide) 1,1-dioxide and ethyl chloroformate.

Methyl N-(4-methoxycarbonyloxy-2-methyl-2H-1,2-benzothiazine-3-carbonyl)-2',4'-dichlorocarbanilate 1,1-dioxide by the reaction of 4-hydroxy-2-methyl-2H-1,2-benzothiazine-3-(2',4'-dichlorocarboxanilide) 1,1-dioxide and methyl chloroformate.

Phenyl N-(4-phenoxycarbonyloxy-2-methyl-2H-1,2-benzothiazine-3-carbonyl)-2'-methoxy-5'-chlorocarbanilate 1,1-dioxide by the reaction of 4-hydroxy-2-methyl-2H-1,2-benzothiazine-3-(2'-methoxy-5'-chloro carboxanilide) 1,1-dioxide and phenyl chloroformate.

Ethyl N-(4-ethoxycarbonyloxy-2-methyl-2H-1,2-benzothiazine-3-carbonyl)-2'-fluoro-5'-trifluoromethylcarbanilate 1,1-dioxide by the reaction of 4-hydroxy-2-methyl-2H-1,2-benzothiazine-3-(2'-fluoro-5'-trifluoromethylcarbanilate) 1,1-dioxide and ethyl chloroformate.

Benzyl N-(4-benzyloxycarbonyloxy-2-methyl-2H-1,2-benzothiazine-3-carbonyl)-4'-bromocarbanilate 1,1-dioxide by the reaction of 4-hydroxy-2-methyl-2H-1,2-benzothiazine-3-(4'-bromocarboxanilide) 1,1-dioxide and benzyl chloroformate.

Methyl N-(4-methoxycarbonyloxy-2-methyl-2H-1,2-benzothiazine-3-carbonyl)-2'-chlorocarbanilate 1,1-dioxide by the reaction of 4-hydroxy-2-methyl-2H-1,2-benzothiazine-3-(2'-chlorocarboxanilide) 1,1-dioxide and methyl chloroformate.

Phenyl N-(4-phenoxycarbonyloxy-2-ethyl-2H-1,2-benzothiazine-3-carbonyl)carbanilate 1,1-dioxide by the reaction of 4-hydroxy-2-ethyl-2H-1,2-benzothiazine-3-carboxanilide 1,1-dioxide and phenyl chloroformate.

Benzyl N-(4-benzyloxycarbonyloxy-2-ethyl-2H-1,2-benzothiazine-3-carbonyl)-3'-chlorocarbanilate 1,1-dioxide by the reaction of 4-hydroxy-2-ethyl-2H-1,2-benzothiazine-3-(3'-chlorocarboxanilide) 1,1-dioxide and benzyl chloroformate.

Phenyl N-(4-phenoxycarbonyloxy-2-n-propyl-2H-1,2-benzothiazine-3-carbonyl)carbanilate 1,1-dioxide by the reaction of 4-hydroxy-2-n-propyl-2H-1,2-benzothiazine-3-carboxanilide 1,1-dioxide and phenyl chloroformate.

Ethyl N-(4-ethoxycarbonyloxy-2-n-propyl-2H-1,2-benzothiazine-3-carbonyl)-3'-chlorocarbanilate 1,1-dioxide by the reaction of 4-hydroxy-2-n-propyl-2H-1,2-benzothiazine-3-(3'-chlorocarboxanilide) 1,1-dioxide and ethyl chloroformate.

Ethyl N-(4-ethoxycarbonyloxy-2-methyl-2H-1,2-benzothiazine-3-carbonyl)-2',4'-dimethoxycarbanilate 1,1-dioxide by the reaction of 4-hydroxy-2-methyl-2H-1,2-benzothiazine-3-(2',4'-dimethoxycarboxanilide) 1,1-dioxide and ethyl chloroformate.

Ethyl N-(4-ethoxycarbonyloxy-2-methyl-2H-1,2-benzothiazine-3-carbonyl)-2'-methoxy-5'-methyl-carbanilate 1,1-dioxide by the reaction of 4-hydroxy-2-methyl-2H-1,2-benzothiazine-3-(2'-methoxy-5'-methylcarboxanilide) 1,1-dioxide and ethyl chloroformate.

EXAMPLE IV

A 57% mineral oil suspension of sodium hydride (2.95 g) is washed with pentane by decantation to remove the mineral oil and covered with 100 ml of dry 1,2-dimethoxyethane to obtain a slurry containing 1.68 g (0.07 mole) of sodium hydride. 4-Hydroxy-2-methyl-2H-1,2-benzothiazine-3-carboxanilide 1,1-dioxide, 9.91 g (0.03 mole), is added to the sodium hydride slurry whereupon a reaction takes place with the evolution of hydrogen gas. After the gas evolution subsides, 8.68 g (0.08 mole) of ethyl chloroformate is added in one portion with stirring whereupon further gas evolution occurs. The mixture is stirred for several hours to complete the formation of the desired ethyl N-(4-ethoxycarbonyloxy-2-methyl-2H-1,2-benzothiazine-3-carbonyl)carbanilate 1,1-dioxide product and sodium chloride by-product. The latter is removed by filtration and the filtrate subjected to reduce pressure to obtain the product as residue. The latter may be recrystallized from acetone-methanol to obtain a purified product having properties identical to that described in Example I.

EXAMPLE V

In a manner similar to that described in Example IV, the following compounds may be prepared from the appropriate carboxanilide compound and appropriate chloroformate by employing sodium hydride as condensing agent.

Methyl N-(4-methoxycarbonyloxy-2-methyl-2H-1,2-benzothiazine-3-carbonyl)carbanilate 1,1-dioxide by the reaction of 4-hydroxy-2-methyl-2H-1,2-benzothiazine-3-carboxanilide 1,1-dioxide and methyl chloroformate.

Phenyl N-(4-phenoxycarbonyloxy-2-methyl-2H-1,2-benzothiazine-3-carbonyl)carbanilate 1,1-dioxide by the reaction of 4-hydroxy-2-methyl-2H-1,2-benzothiazine-3-carboxanilide 1,1-dioxide and phenyl chloroformate.

Isoamyl N-(4-isoamyloxy-2-methyl-2H-1,2-benzothiazine-3-carbonyl)carbanilate 1,1-dioxide by the reaction of 4-hydroxy-2-methyl-2H-1,2- benzothiazine-3-carboxanilide 1,1-dioxide and oamyl chloroformate.

EXAMPLE VI

Ethyl N-(4-Ethoxycarbonyloxy-2-ethyl-2H-1,2-benzothiazine-3-carbonyl)carbanilate 1,1-dioxide In a manner similar to that described in Examples I and II, 25 ml of ethyl chloroformate is added dropwise with stirring to a solution of 20.6 g (0.06 mole) of 4-hydroxy-2-ethyl-2H-1,2-benzothiazine-3-carboxanilide 1,1-dioxide in 250 ml of dry pyridine, the resulting mixture stirred for about an hour at ambient temperature and then poured into hydrochloric acid-ice mixture to precipitate the desired ethyl N-(4-ethoxycarbonyloxy-2-ethyl-2H-1,2-benzothiazine-3-carbonyl)carbanilate 1,1-dioxide product having a molecular weight of 488.5.

The novel compounds of the present invention have biological properties which are adaptable for utilization in therapeutic compositions. Thus, the products of the present invention have anti-inflammatory properties rendering them useful as components in compositions for combatting swelling and pain in inflammatory disorders such as arthritis. A representative operation showing anti-inflammatory activity is the M.butyricum induced rat paw edema assay. In this test, 160–190 gram rats which previously had been injected subcutaneously in one hind paw with 0.75 mg of M. butyricum and in which by the eleventh day there had been induced edema of at least 0.25 ml were employed. Test animals were dosed daily for 4 days thereafter with ethyl N-(4-ethoxycarbonyloxy-2-methyl-2H-1,2-benzothiazine-3-carbonyl)carbanilate 1,1-dioxide at a dose of 50 mg/kg (per os) while control animals were given saline. Comparison of the paw sizes of treated and control animals on the first and fifth days showed 47.3% edema inhibition in the paw of the treated animals. Similarly, edema inhibition may be observed employing the subject compounds at dosages in the range of from about 0.5 to about 100 mg/kg.

The carboxanilide compound starting materials of Formula II generally are known compounds or may be prepared readily from known materials by methods described in the literature. Thus, the compounds of Formula II may be prepared from 2-alkyl-2H-1,2-benzothiazin-4(3H)-one 1,1 dioxide (VII) and aryl isocyanate (ArN=C=O) in the presence of sodium hydride (1) by adding a solution of Compound VII and aryl isocyanate in an inert solvent such as dimethylformamide to a slurry of sodium hydride at ambient temperature or by adding Compound VII portionwise to a mixture of the isocyanate and alkali metal hydride, and (2) by pouring the resulting reaction mixture into a slightly acidic ice water to precipitate the compound of Formula II:

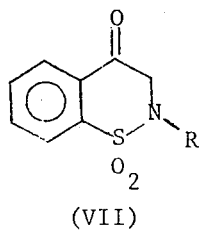

+ O=C=N-Ar $\xrightarrow{NaH}$ $\xrightarrow{H^+}$ II (VII)

Alternatively, it may be prepared by reacting a N-alkyl derivative of alkyl 4-hydroxy-2H-1,2-benzothiazine 3-carboxylate-1,1-dioxide (VIII) with an appropriately substituted aniline at elevated temperatures (about 120°–150°C) for from several hours to several days in the presence of p-toluenesulfonic acid catalyst and preferably under nitrogen atmosphere:

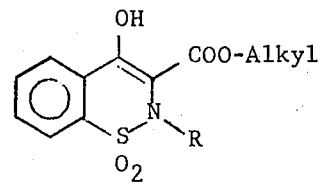

(VIII)

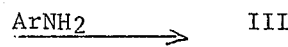

The operations represented by the foregoing equations as well as a method used to prepare 2-alkyl-4-hydroxy-3-(lower alkoxycarbonyl)-2H-1,2-benzothiazine 1,1-dioxide (VIII) may be found in U.S. Pat. Nos. 3,501,466 and 3,591,584.

Numerous chloroformic esters are commercially available. Other alkyl chloroformates may be prepared from the appropriate alcohol and phosgene by methods well known to the skilled in the art.

I claim:

1. A compound represented by the formula

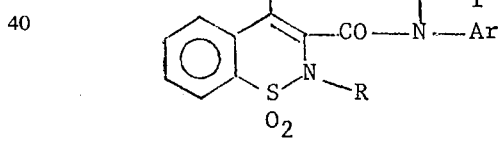

wherein
R is lower alkyl
$R_1$ is selected from the group consisting of lower alkyl, benzyl, phenyl,
Ar is an aryl radical selected from the group consisting of phenyl and substituted phenyl wherein the substituent in said substituted phenyl is selected from the group consisting of lower alkyl, lower alkoxy, halo and trifluoromethyl.

2. A compound according to claim 1 which is ethyl N-(4-ethoxycarbonyloxy-2-methyl-2H-1,2-benzothiazine-3-carbonyl)carbanilate 1,1-dioxide.

* * * * *